United States Patent [19]

Schneider

[11] Patent Number: 4,795,228

[45] Date of Patent: Jan. 3, 1989

[54] FIBER TAPER PARTICULARLY USEFUL FOR COUPLING A MONOMODE FIBER TO A SEMICONDUCTOR LASER

[75] Inventor: Hartmut Schneider, Munich, Fed. Rep. of Germany

[73] Assignee: Siemens Aktiengesellschaft, Berlin and Munich, Fed. Rep. of Germany

[21] Appl. No.: 934,338

[22] Filed: Nov. 24, 1986

[30] Foreign Application Priority Data

Dec. 13, 1985 [DE] Fed. Rep. of Germany ....... 3544136

[51] Int. Cl.$^4$ .............................................. G02B 6/32
[52] U.S. Cl. ................... 350/96.18; 350/96.33
[58] Field of Search ............... 350/96.15, 96.30, 96.33, 350/96.18

[56] References Cited

U.S. PATENT DOCUMENTS

| | | | |
|---|---|---|---|
| 4,266,851 | 5/1981 | Salisbury | 350/96.15 |
| 4,306,767 | 12/1981 | Kawachi et al. | 350/96.33 |
| 4,448,480 | 5/1984 | Witte | 350/96.15 |
| 4,565,558 | 1/1986 | Keil et al. | 65/1 |
| 4,589,897 | 5/1986 | Mathyssek et al. | 65/2 |

FOREIGN PATENT DOCUMENTS

| | | | |
|---|---|---|---|
| 0011044 | 1/1977 | Japan | 350/96.15 |
| 0123512 | 7/1983 | Japan | 350/96.15 |
| 0069008 | 4/1986 | Japan | 350/96.15 |
| 0100705 | 5/1986 | Japan | 350/96.15 |

OTHER PUBLICATIONS

R. Keil et al., "Experimental Investigation of the Beam Spot Size Radius in Single-Mode Fibre Tapers" *Electronics Letters,* V. 20, No. 15, Jul. 19, 1984, pp. 621–622.

R. Keil et al., "Coupling Between Semiconductor Laser Diodes and Single-Mode Optical Fibers" *Siemens Forsch.-u. Eutwickl.-Ber.,* V. 13, Nr. 6, 1984, pp. 284–288.

D. Marcuse, "Loss Analysis of Single-Mode Fiber Splices" *The Bell System Technical Journal,* V. 56, No. 5, May–Jun. 1977, pp. 703–718.

*Primary Examiner*—Eugene R. Laroche
*Assistant Examiner*—Seung Ham
*Attorney, Agent, or Firm*—Hill, Van Santen, Steadman & Simpson

[57] ABSTRACT

A fiber taper in the form of a fiber with a conically tapering at one end and having a step-shaped refractive index profile which is particularly used for coupling a single-mode fiber to a semiconductor laser. The fiber will have a core with a high index of refraction surrounded by an intermediate core layer with an index of refraction being lower by a defined index of refraction difference than the index of refraction of the core. The intermediate core layer is surrounded by a jacket or cladding layer of a lower refractive index which is lower than the refractive index of the core layer by a defined refractive index difference. An expanding beam is established given such a taper and an adiabatic mode matching from one to the other core can be achieved along the taper.

4 Claims, 1 Drawing Sheet

FIBER TAPER PARTICULARLY USEFUL FOR COUPLING A MONOMODE FIBER TO A SEMICONDUCTOR LASER

BACKGROUND OF THE INVENTION

The present invention is directed to a fiber taper in the form of fiber conically tapering at one end, said fiber having a step-shaped refractive index profile with a core with a high refractive index surrounded by a jacket with a lower refractive index. The core tapers at the one end and the fiber taper is particularly useful for coupling a single-mode fiber to a semi-conductor laser.

Tapers of the above mentioned type are particularly useful for an efficienct in-coupling of laser light emitted by a semi-conductor laser into a single-mode fiber. Such an efficient coupling of the laser emission into a single-mode fiber is an important prerequisite for the realization of optical single-mode transmission links. The large aperture angle of the laser beam usually limits the degree of in-coupling efficiency. A very efficient coupling can be achieved by employing a taper arranged between the fiber and the laser and a spherical lens arranged between the end of the taper and the laser. The taper is thereby arranged such that it tapers convergently towards the laser.

In previous embodiments, the taper is fashioned as a conically tapered end of a fiber which comprises a core surrounded by a jacket. It can be manufactured so that the fiber is locally softened and drawn so that a constriction occurs. Then the fiber is parted in or close to a location of its narrowest diameter. The two separate portions of the fiber then each have a taper and the spherical lens can be directly fused to the tapering end of the taper, for example, by means of all around melting of this end in an arc or in a flame.

Since the fiber diameter and core diameter both decrease in the same ratio during the drawing process in such a manufacturing method, a widening of the spot size of the fundamental mode of the fiber section theoretically occurs with decreasing core diameter. This has been experimentally confirmed, for example, see the article by R. Keil et al entitled: "Experimental Investigation of the Beam Spot Size Radius in Single-Mode Fibre Tapers", *Electronics Letters,* July 19, 1986, Vol. 20, No. 15, pages 621–622. Since a larger spot diameter enables a wider coupling distance, this is extremely advantageous. The effects of the reflection at the lens surface are thus reduced.

With the large spot diameter in the thin taper, however, considerable emission losses are obtained at the surface of the taper or of the fiber which is usually rough and adjacent to air. These losses occur because of the poor guidance of the light in the disappearing thin core. A fiber having a diameter 125 μm may, therefore, be tapered to one half the diameter, i.e. 60 μm. The formation of the lens with an optimum 20 μm diameter is achieved by a tip melting of the taper, such as disclosed in an article by R. Keil et al entitled: "Coupling Between Semiconductor Laser Diodes and Single-Mode Optical Fibers", *Siemens Frosch. u. Entwickl.- Ber.,* Vol. 13, No. 6, 1984, pages 284–288.

SUMMARY OF THE INVENTION

The object of the present invention is to provide a taper of the above mentioned type which exhibits no or only slight emission losses.

These objects are obtained by an improvement in a fiber taper of a form of a fiber conically tapering at one end, said fiber having a step-shaped refractive index profile with a core having a higher refractive index surrounded by a jacket or cladding with a lower refractive index, said core tapering at the one end and being particularly useful for coupling a single-mode fiber to a semiconductor laser. The improvements are that a further or intermediate core layer is immediately surrounding the core and is provided between the core and the jacket or cladding. The refractive index of this intermediate or further core layer being lower by defined refractive index difference $\Delta n_1$ than that of the index of the core and being higher by a defined refractive index difference $\Delta n_2$ than that of the jacket or cladding.

In the taper of the invention, the light emitted by the disappearing thin core is guided by this additional intermediate core which sees to the low loss guidance.

It is expedient to dimension the taper of the invention so that the radius of the core and the refractive index difference $\Delta n_1$ between the core and the intermediate core or layer of the taper are selected to equal the radius of a core of the single-mode fiber and to a refractive index difference between the core of the single-mode fiber and its cladding immediately surrounding the core which single-mode fiber is to be coupled to one end of the taper.

It is also expedient in the taper of the invention when it comprises a lens that is melted onto the end. The manufacture of taper with the assistance of appropriate fiber which comprises a core, the intermediate core and the jacket can occur as herebefore, for example, by local softening and drawing of the fiber into two tapering cores which are finally separated.

The manufacture of the fiber preferably occurs by providing a rod-shaped preform having the corresponding structure, for example, a preform having a core and intermediate core layer surrounded by a jacket or cladding layer with the radius of the core, core layer and cladding being in the same ratio to the radius of the core, core layer and cladding of the fiber which is to be drawn therefrom.

The invention shall be set forth in greater detail in the following description with reference to the figures.

It should be noted that the FIGS. are not drawn to scale.

DESCRIPTION OF THE PREFERRED EMBODIMENTS

Figure 1:
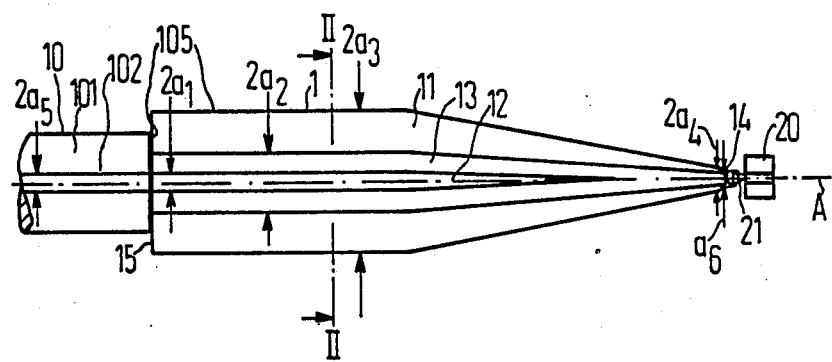
FIG. 1 is a side view of a coupling of light emitted by a laser diode into a single monomode fiber by means of the proposed taper of the present invention having a lens melted thereon.

The principles of the present invention are particularly useful when incorporated in a taper 1 of FIG. 1.

The taper 1 of FIG. 1 is illustrated as a coupling device which serves the purpose of coupling a laser beam 21 which is emitted by a laser diode 20 into a single-mode fiber 10 comprising a jacket or cladding 101 which surrounds the core 102. While acting as a coupling device, the fiber taper is arranged essentially coaxial relative to an axis A of the laser beam and has its tapered end having a diameter $2a_4$ facing the laser beam 21. The tapered end forms a refracting hemispherical lens 14 which, for example, has been produced by melting the end of the fiber taper. The other end 15 of the fiber taper 1 is a planar end face with the single-mode fiber 10 has its end face 105 butt-coupled coaxially to the fiber taper 1. The taper 1 conically tapers towards the right in the direction towards the laser diode 20 tapering from the outside diameter $2a_3$ down to the smaller diameter $2a_4$ at the lens 14. The taper has a core 12 surrounded by an intermediate core or layer 13 which, in turn, is surrounded by the cladding or jacket 11. The core 12, intermediate core or layer 13 and the jacket 11 all taper similarly towards the right to the laser diode and the core 12 tapers conically from a core diameter $2a_1$ to a disappearing small diameter in the proximity of the lens 14. The intermediate core 13 is arranged between the core 12 and the jacket or cladding 11 and this intermediate core immediately surrounds the core 12 and tapers from a relatively large core diameter $2a_2$ down to a small core diameter $2a_6$ at the lens 14. This latter diameter $2a_6$ being, in fact, smaller than the diameter $2a_4$ but not disappearingly small. The diameter $2a_1$ of the core 12 of the taper 1 is selected to be equal to the diameter $2a_5$ of the core 102 of the single-mode fiber 10 which serves, for example, as a transmission link. Thus, the diameter and radius of the core 12 and the core 102 are the same.

Figure 2:
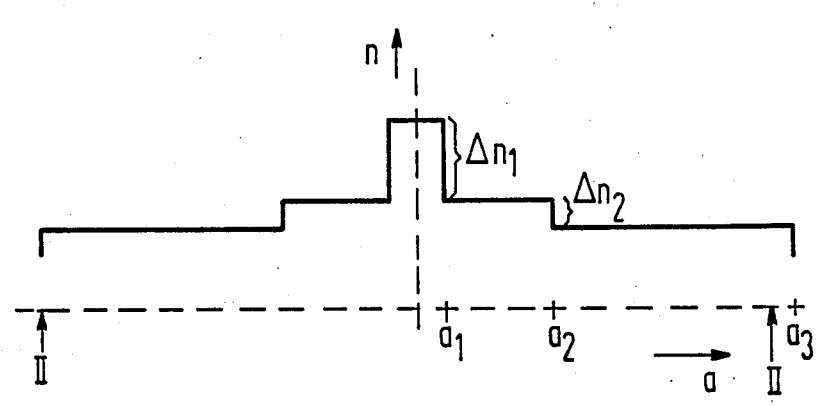
FIG. 2 is a graph illustrating the relationship of the index of refraction and the radius for the double step-shaped refractive index profile of the taper taken along lines II—II of FIG. 1.

The step-shaped refractive index profile of the taper 1 is illustrated in FIG. 2. It is a double step-shaped profile. The highest refractive index is present in the core 12 which has a radius $a_1$ and the refractive index of the intermediate core or layer 13 is smaller than the refractive index of the core 12 by a refractive index differential $\Delta n_1$. The refractive index of the jacket or cladding 11 is lower than the refractive index of the intermediate core or layer 13 by a refractive index difference $\Delta n_2$. The profile is illustrated with the layer or intermediate core 13 extending from a radius $a_1$ to $a_2$ and the cladding or jacket 11 extending from the radius $a_2$ to $a_3$. It is noted that this double step profile is present not only in the region of the taper 1 having the radius $a_3$ but also present in the conical or tapering portion.

With a decrease guidance of the laser beam 21 coupled into the taper 1 via the lens 14 in the core 12 along the taper 1, the light passes over into the additional core or layer 13 which then sees to a low-loss guidance. Independently of the taper path ratio $a_3/a_4$, the desired spot size at the end 15 of the taper can then be set via the refractive index difference $\Delta n_2$ between the additional core 13 and the cladding 11.

In accordance with the known equation set forth in an article by D. Marcus entitled: "Loss Analysis of Single-Mode Fiber Splices", *Bell System Technical Journal*, Vol. 56, No. 5, May–June 1977, page 703–718, $$\omega_o = a \cdot 0.65 + \frac{1.619}{V^{3/2}} + \frac{2.879}{V^6}$$

with $V = 2\pi a \cdot n \sqrt{\Delta n/n'}/\lambda$, it suffices to select the refractive index difference $\Delta n_2$ at approximately $\Delta n_2 = \frac{1}{4}\Delta n_1$ for a desired doubling of the spot size $\omega_o$ when the radius $a_2$ of the additional core 13 is set precisely such that the reduced radius $a_6$ of this core 13 at the tapered end of the lens should correspond to the radius $a_1$.

Not only should the radius $a_5$ of the core 102 which is $\frac{1}{2}$ of the diameter $2a_5$ of the single-mode fiber 10 be selected equal to the radius $a_1$ but the refractive index between the core 102 and the jacket 101 of this fiber should also be selected equal to the refractive index difference $\Delta n_1$.

The manufacture of the taper can, for example, occur by providing a fiber preform having a refractive index profile of FIG. 2, then locally heating and pulling the fiber preform apart so that a constriction would be formed and this constriction is then parted at its narrowest location. The melt-on of the hemispherical, refracting lens can occur during the parting step, for example, with assistance of an arc or can occur subsequent thereto.

The fiber having a double step profile of FIG. 2 is preferably produced from a rod-shaped preform that has the same profile. The preform can be manufactured in accordance with known methods, for example, the MCVD method or the OVD method.

In the MCVD method for single-mode fibers, a three-zone structure is expediently realized, wherein two zones of a super-pure glass are deposited onto the inside wall of a silica glass tube. The silica glass tube yields the jacket 11, the first zone deposited onto the silica glass tube provides the additional layer or core 13 in the inside or second zone that was deposited on the first zone provides the core 12. $\Delta n_2$ is usually small. Thus, it suffices for the manufacture of the fiber having the double step profile is to merely shift the dopant ratio phosphorous to fluorine in the middle zone towards a higher P-doping or to additionally dope with germanium in order to realize a suitable double step structure.

After the two zones have been deposited, the tube is collapsed to form a rod. The thickness of the zones and of the tube are to be selected so that after the collapsing, the radius of the core, the radius of the additional core or zone layer and the outside radius of the rod reside with the ratio of $a_1:a_2:a_3$ betting typically 1:6:16.

The proposed fiber taper with the double step profile delivers a beam expanding in the taper and can be dimensioned such that an adiabatic mode matching from one to the other of the two cores occurs along the taper. Thus, the advantages of optimizing the beam expanding in the taper will occur.

The proposed principle of the beam expanding in the taper is employable not only for the required matching of the different modes of the fiber and semiconductor laser to one another but can also be employed whenever different waveguide modes are to be matched to one another.

Further, the optical feedback into a laser, which must be avoided insofar as possible, can also be reduced further with the proposed taper than was hitherto possible.

Although various minor modifications may be suggested by those versed in the art, it should be understood that I wish to embody with the scope of the patent granted hereon, all such modifications as reasonably and properly come within the scope of my contribution to the art.

I claim:

1. In a fiber taper in the form of a fiber conically tapering at one end and useful for coupling a single-mode fiber disposed at a second end of the tape to a semiconductor laser located at the one end, said fiber taper having a step-shaped refractive index profile and having a core with a high refractive index surrounded by a cladding with a lower refractive index, said core and cladding tapering at the one end, the improvements comprising an intermediate core layer being interposed between the core and the cladding and immediately surrounding the core, said intermediate core layer having a refractive index lower by a defined refractive index difference $\Delta n_1$ than the refractive index of the core and being higher by a defined refractive index difference $\Delta n_2$ than a refractive index of the cladding.

2. In a fiber taper according to claim 1, wherein a lens is melted onto the one end of the fiber taper.

3. In a fiber taper in the form of a fiber conically tapering at one end and useful for coupling a single-mode fiber to a semiconductor laser, said fiber taper having a step-shaped refractive index profile and having a core with a high refractive index surrounded by a cladding with a lower refractive index, said core and cladding tapering at the one end, the improvements comprising an intermediate core layer being interposed between the core and the cladding and immediately surrounding the core, said intermediate core layer having a refractive index lower by a defined refractive index difference $\Delta n_1$ than the refractive index of the core and being higher by a defined refractive index difference $\Delta n_2$ than a refractive index of the cladding, the taper having a second end connected to a single-mode fiber having a fiber core with a fiber core radius surrounded by a jacket, a radius of said core of the taper at the second end and the refractive index difference $\Delta n_1$ between the core and the intermediate core layer of the taper being selected to be equal to the fiber core radius and the refractive index difference between the fiber core and jacket of the single-mode fiber which is coupled to the second end of the taper.

4. In a taper according to claim 3, wherein a lens is connected to the one end opposite the single-mode fiber.

* * * * *